INVENTOR.
LEONARD SCHROEDTER

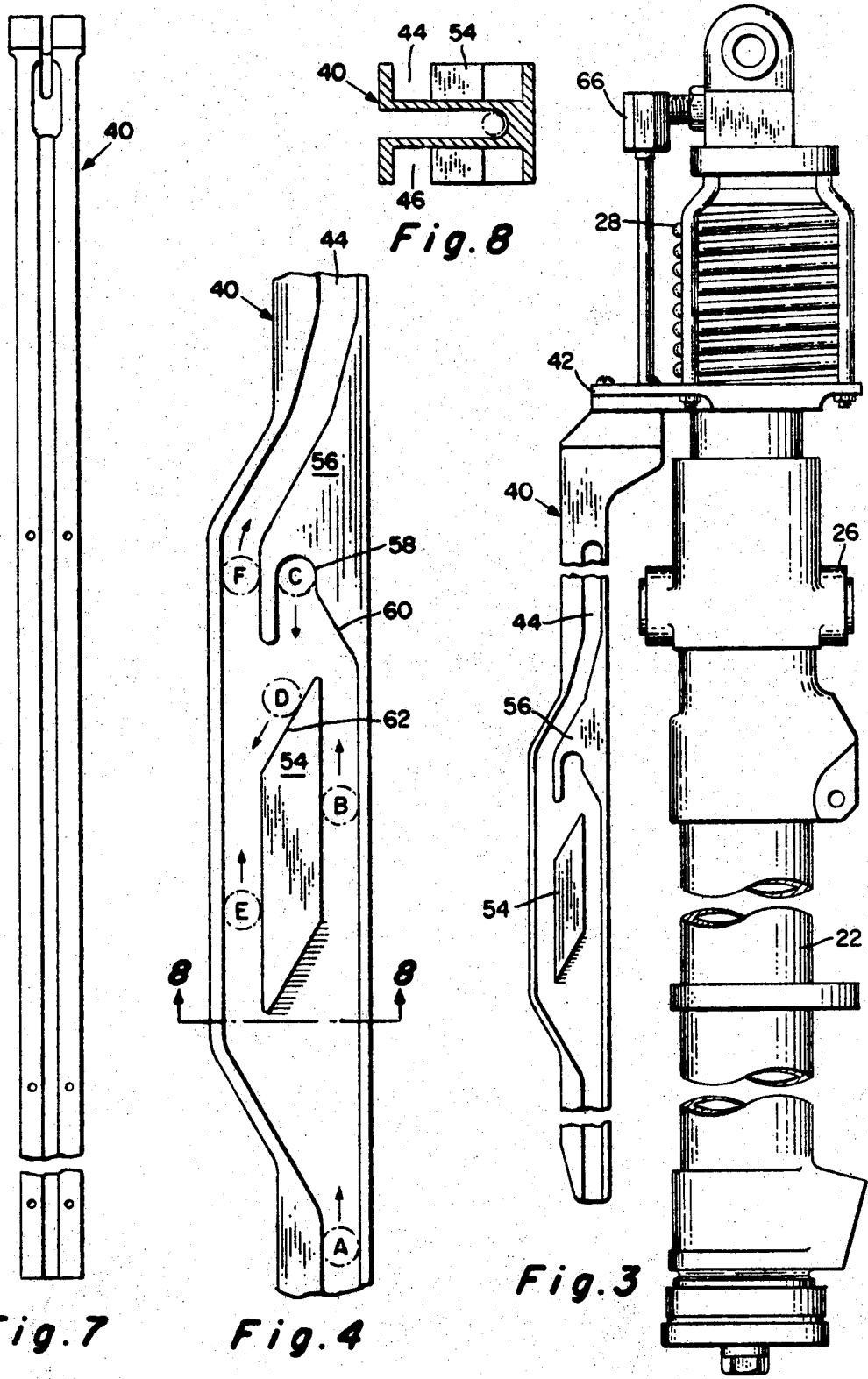

May 14, 1968 L. SCHROEDTER 3,382,612
SAFETY MECHANISM FOR AIRCRAFT CANOPIES
Filed June 21, 1966 4 Sheets-Sheet 4
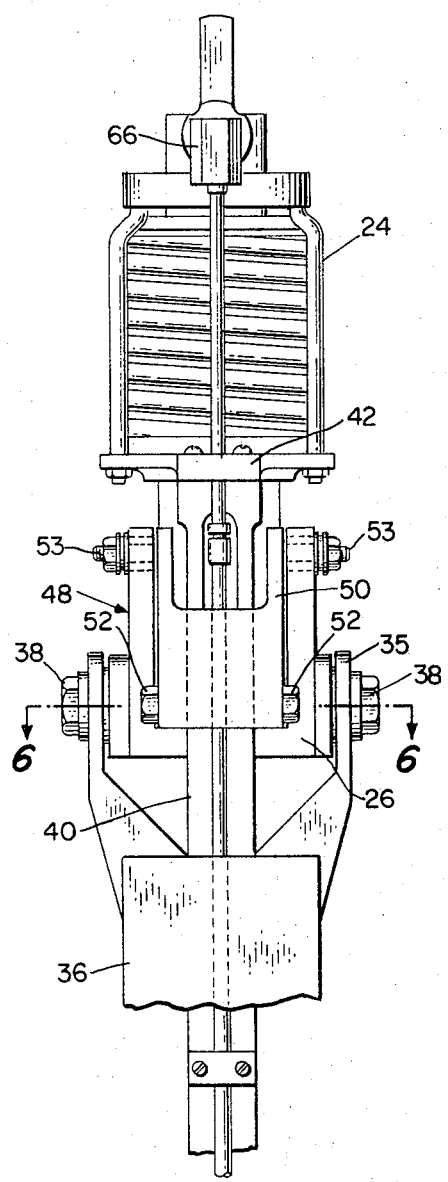
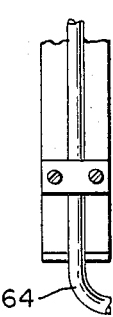
Fig. 5
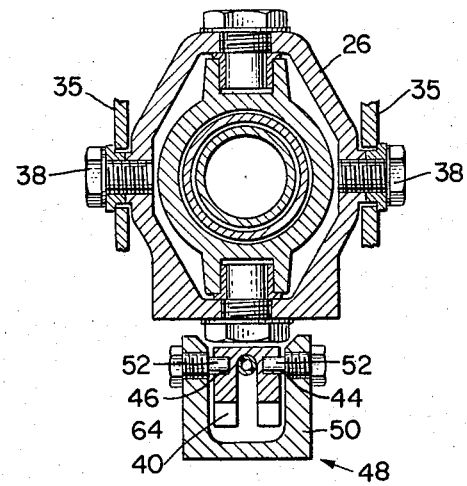
Fig. 6

United States Patent Office 3,382,612
Patented May 14, 1968

3,382,612
SAFETY MECHANISM FOR AIRCRAFT CANOPIES
Leonard Schroedter, La Palma, Calif., assignor, by mesne assignments, to the United States of America as represented by the Secretary of the Navy
Filed June 21, 1966, Ser. No. 560,383
6 Claims. (Cl. 49—340)

The invention described herein may be manufactured and used by or for the Government of the United States of America for governmental purposes without the payment of any royalties thereon or therefor.

The present invention relates to aircraft, and more particularly to means for reducing the possibility of injury to personnel in or near the aircraft cockpit who are unaware that the canopy enclosing the latter is being actuated to closed position.

Accidents of a serious nature have occurred as a result of aircraft canopies closing upon some portion of the body of an individual who was unaware that the closing operation was being conducted. Steps have been taken to install safety locks or catches with a view toward preventing such occurrences, but invariably these expedients have either been unreliable, excessively complex, or have possessed unacceptable weight and/or size characteristics. There is a need for some device which will be simple, jam-proof, of small dimensions, and capable of automatically interrupting the canopy closing sequence short of a point where a personnel hazard arises. Furthermore, an ideal safety mechanism of this type will require little or no maintenance as such over extended periods of time. It is an objective of the present invention to provide such a device.

In accordance with a feature of the concept herein disclosed, an elongated bar is associated with the piston of the hydraulic cylinder which actuates the canopy. This bar has a pair of longitudinal grooves formed therein, and a pair of pawls mounted on the cylinder housing respectively ride in these grooves. The latter are configured so that a recess is present intermediate the two extremities of each groove, and, during the canopy closing sequence, the two pawls enter their respective recesses to preclude further continuous movement of the canopy. In order to complete the closing sequence, the direction of movement of the canopy must be controllably reversed for a short distance to permit the pawls to leave their respective recesses. Upon such action, the pawls are placed in a position to resume their forward movement along the grooves until the canopy is completely closed. It will thus be seen that a *controlled* reversal of the action of the closure mechanism is necessary at an intermediate point in the cycle to bring the canopy to a position where it presents a personnel hazard, and hence it is not possible for the canopy to reach such a position without the knowledge and consequent positive action of an individual within the aircraft cockpit who has direct access to the manual controls and who can make a visual determination that no hazardous condition exists.

One object of the present invention, therefore, is to provide a safety mechanism for aircraft canopies that will eliminate, or at least materially reduce, the possibility of inadvertent injury to personnel when the canopy is actuated to fully closed position.

Another object of the invention is to provide a safety mechanism for aircraft canopies that is not only simple in construction but also light in weight, reliable, and which requires minimum maintenance over extended periods of time.

An additional object of the invention is to provide a safety mechanism for aircraft canopies that will prevent a complete closing of the canopy in a single continuous movement, and which requires that the closing action of the canopy be controllably reversed for a short distance at an intermediate point in the cycle before the closing action can be resumed.

Other objects, advantages, and novel features of the invention will become apparent from the following detailed description when considered in conjunction with the accompanying drawings in which:

FIG. 3 is a partly sectional view of certain of the elements of FIG. 2, showing more clearly the design of the elongated bar which is associated with the piston of the hydraulic cylinder;

FIG. 4 is an enlarged view of a portion of FIG. 3, showing the various positions assumed by the pawl that rides in one of the grooves of the elongated bar of FIG. 3 as the canopy closing cycle is completed;

FIG. 5 is a detailed view of the trunnion of FIGS. 1, 2 and 3, illustrating the manner in which it is pivotally carried by the aircraft fuselage;

FIG. 6 is a sectional view of FIG. 5 taken along the line 6—6;

FIG. 7 is a top view of the elongated bar of FIG. 3; and

FIG. 8 is a sectional view of the bar of FIG. 4 taken along the line 8—8.

Figure 1:
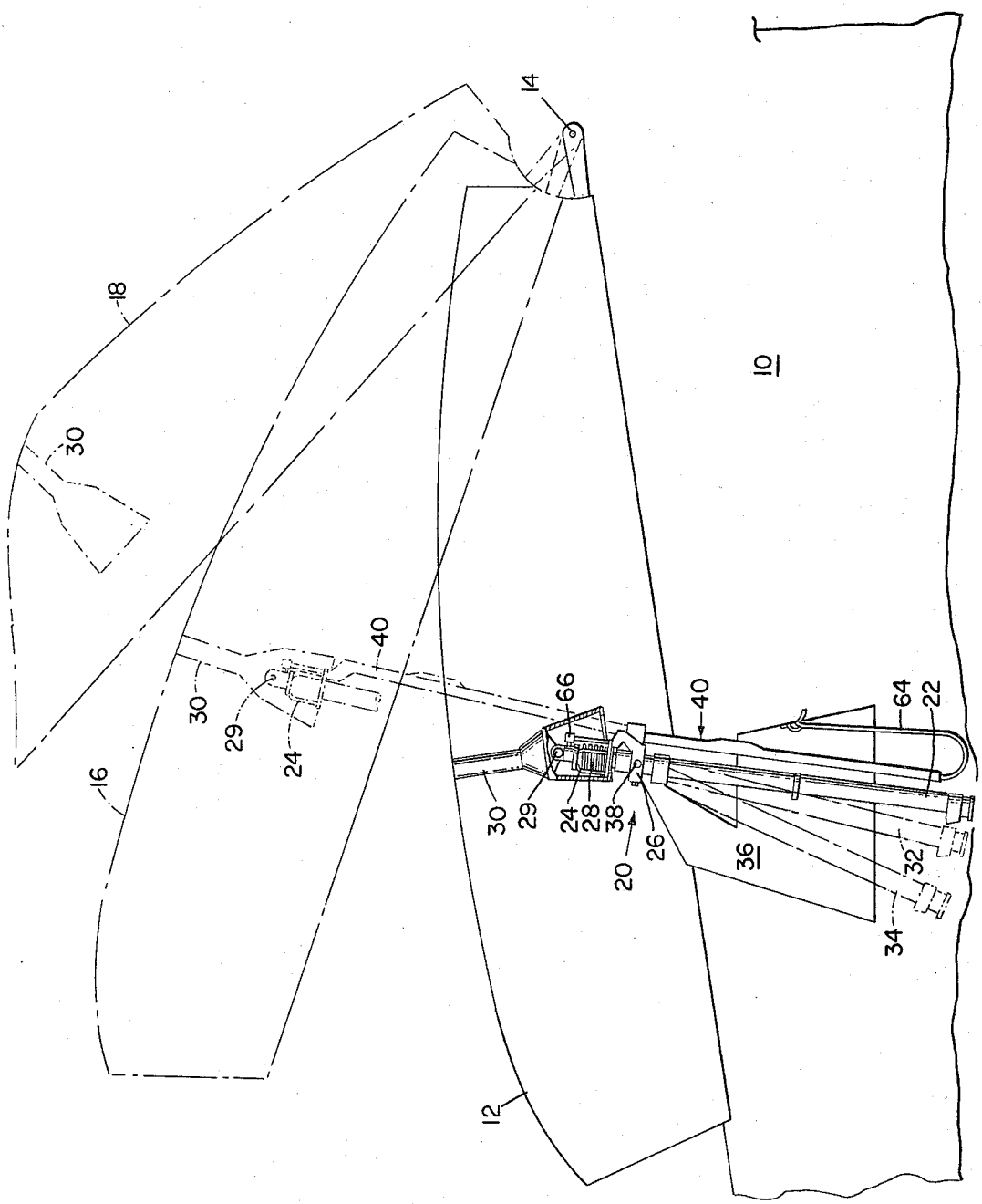
FIG. 1 is a side elevational view, in partially schematic form, of a safety mechanism for aircraft canopies designed in accordance with a preferred embodiment of the present invention.

Referring first to FIG. 1 of the drawings, the reference numeral 10 represents a portion of the fuselage of an aircraft having a cockpit the open top of which is closed by a canopy 12. This canopy 12 is hinged at 14 to some fixed point on the aircraft fuselage, and is designed to be actuated from the closed position shown in solid lines to an open position shown in broken lines and designated by the reference character 16. The canopy 12 is additionally capable of being actuated to a further extended position also shown in broken lines and indicated by the reference number 18 when it is desired to jettison the canopy in an emergency, following which the pilot is ejected from the aircraft for a parachute landing.

The canopy 12 is actuated between the open and closed positions shown by means of a hydraulic cylinder the energization of which is manually controlled by an individual within the aircraft cockpit. Inasmuch as this cylinder and its associated operating mechanism form no part of the present invention, the details thereof will not be set forth in the present application, and it will merely be stated that the cylinder, generally identified in FIG. 1 of the drawings by the reference numeral 20, includes a housing 22 designed to selectively receive therewithin a piston assembly 24. The housing 22 is pivotally attached by a gimbal 26 to some rigid portion of the aircraft fuselage 10, so that the housing 22 is capable of arcuate movement about the pivot point of gimbal 26 as the canopy 12 moves to either its open position 16 or its jettison position 18. Further structural details of the hydraulic cylinder 20 will be set forth in connection with FIG. 2 of the drawings. However, the upper portion of the piston assembly 24 is connected through a resilient member 28 to a pivot point 29 on a fitting 30, which in turn is mounted on the inside surface of the canopy 12, shown in FIG. 1.

Upon selective energization of the cylinder control (not shown) when the canopy 12 is closed, the piston assembly 24 is extended from its housing 22, and this action continues until the canopy has reached its open position indicated by the reference numeral 16 in FIG. 1. During this extension, the housing 22, which is carried by the gimbal 26, undergoes a limited arcuate movement until it reaches the position indicated at 32 in FIG. 2. In the event that the canopy 12 is to be jettisoned, the piston assembly 24 is extended still further, and the housing 22 undergoes a still further arcuate movement to reach the position indicated at 34 in FIG. 2. As will be brought out in connection with a description of FIGS. 5 and 6 of the drawings, the gimbal 26 is pivotally carried by the bifurcated member 35 extending from a fitting 36 rigidly secured to the fuselage 10 of the aircraft. Consequently, the gimbal 26 undergoes only rotary movement about its pivot 38. On the other hand, the piston assembly 24 moves in the usual fashion longitudinally (or axially) of its housing 22, so that it may reach either the "normal open" position of the canopy 12 indicated in FIG. 1 of the drawings by the reference numeral 16, or the "canopy jettison" position shown in FIG. 1 by the reference numeral 18. In any event, this mode of power operation of the canopy 12 by selective energization of the cylinder 20 forms no part of the present invention, and the preceding description has been set forth merely as an aid to understanding the manner in which the present concept is integrated thereinto.

From the above, it will be recognized that the canopy 12 is capable of being moved from open position to closed position in such a fashion that it constitutes a personnel hazard in the event that some portion of an individual's body may be caught between one edge of the canopy and the corresponding edge of the aircraft cockpit when the canopy approaches a closed position. A principal objective of the present concept is to prevent such an occurrence by requiring a direct action on the part of the person operating the canopy controls just prior to the time that the hazardous condition is brought into being. As a consequence, the possibility of injury to personnel in the vicinity of the aircraft cockpit is almost entirely eliminated.

A basic principle underlying the invention herein disclosed is that the closing action of the canopy may be terminated at an intermediate point in the cycle, following which termination it is necessary for a direct action to be taken by an individual within the cockpit, this action resulting in a reversal of canopy motion toward open position for a short time interval. It is then necessary for the individual operating the canopy controls to again actuate such controls so as to resume the canopy closing movement. The manner in which this mode of operation is achieved will now be set forth in conjunction with a description of that portion of the illustrated mechanism which represents the additions made thereto by the present concept.

Figure 2:
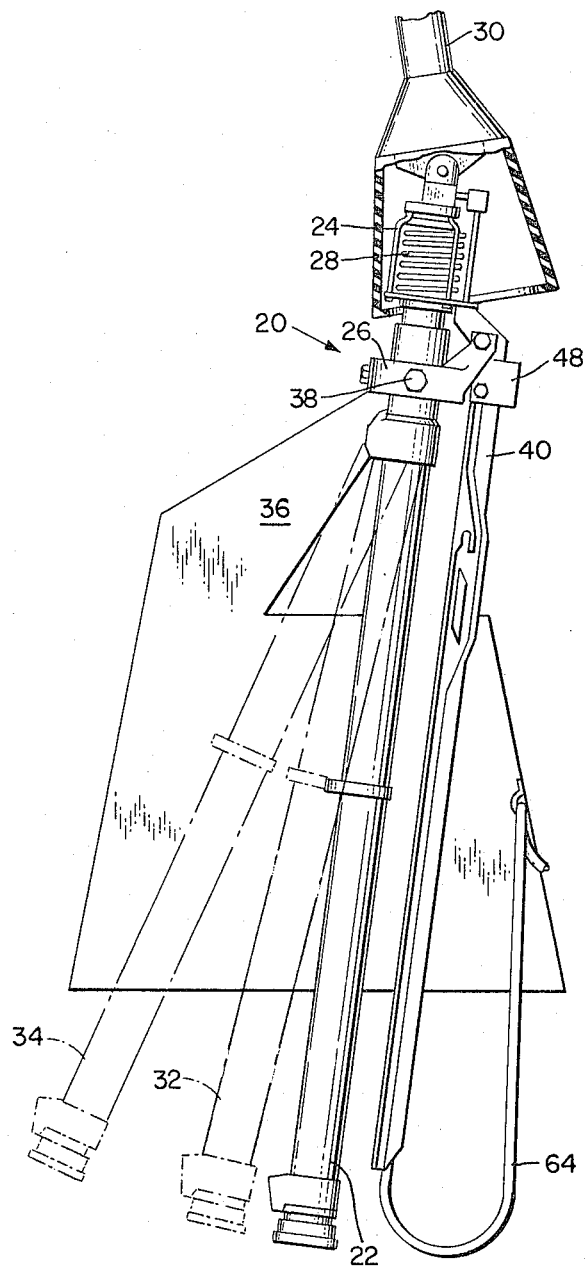
FIG. 2 is an enlarged view of a portion of FIG. 1 bringing out further details of the present invention.

Referring first to FIGS. 1 and 2 of the drawings, it will be noted that the piston assembly 24, which is extendable in selective fashion from the cylinder housing 22, has attached thereto, and carries therewith, an elongate bar 40. The latter is bolted to a coupling member 42 (See FIGS. 3 and 5) which extends laterally outwardly in the region of the resilient coupling member 28. As shown in FIGS. 1, 2 and 3 of the drawings, this elongate bar extends essentially parallel to, but spaced apart from, the moveable piston per se under all conditions of operation, and also lies generally parallel to but spaced apart from the cylinder housing 22 when the canopy 12 is in closed position as shown in solid lines in FIG. 1.

Referring again to FIG. 3 of the drawings, it will be noted that the elongate bar 40 is securely attached to the coupling member 42 which in turn forms a part of the moveable piston assembly 24 of FIGS. 1 and 2. In other words, when the piston per se is extended from the cylinder housing 22, the elongate bar 40 moves as a unit therewith but is axially displaced with respect to the cylinder housing 22. In order to achieve the objectives of the present concept, the elongate bar 40, a cross-sectional view of which is shown in FIG. 8 of the drawings, is of generally U-shaped configuration and is designed with a pair of grooves formed in the two opposite surfaces thereof, these grooves being symmetrical with respect to one another and being so arranged as to face outwardly with respect to the longitudinal axis of the bar 40. Only one of these grooves is visible in FIG. 3, the remaining groove of identical configuration being on the opposite side of the bar. Thus, the rear surfaces of the two grooves in question lies essentially back-to-back, as best shown in the cross-sectional view of FIG. 8 where the rear groove is designated by the reference character 46.

Although the longitudinal groove of the bar 40 that is visible in FIGS. 3 and 4 of the drawings is designated by the overall reference numeral 44, nonetheless this groove 44 contains a recess and a number of reentrant portions the character and purpose of which will be subsequently set forth.

Referring now to FIGS. 5 and 6 of the drawings, it will be seen that the gimbal 26 carriers thereon a pawl unit generally identified by the reference numeral 48. This pawl unit or assembly 48 is made up of a generally U-shaped member 50 within which the elongate bar 40 of FIG. 3 is adapted to slide when the piston assembly 24 is extended or retracted from the cylinder housing 22. As best shown in FIG. 6, the U-shaped member 50 has positioned therein a pair of inwardly-extending pins or pawls 52 one of which is adapted to ride in the groove 44 of the elongate bar 40, and the other of which is adapted to ride in the groove 46 of this bar. FIG. 6 shows the elongated bar 40 in position within the U-shaped member 50. The latter is pivotally attached to the trunnion at 53 (FIG. 5) so that limited angular movement therebetween may occur. It is emphasized that the gimbal 26, and hence the U-shaped adapter 50 carried thereby, does not move axially of the cylinder housing 22, but only rotates through a limited angle about the pivot 38 (when the piston is extended as shown in FIG. 1 of the drawings) to either position 32 (canopy open) or position 34 (canopy jettison) (see FIG. 2). Consequently, as the bar 40 extends (or retracts) along with the piston during operation, the pins 52 of FIG. 6 will ride in their respective grooves 44 or 46. FIG. 5 is a top view of the gimbal assembly, and also illustrates the relationship between the elongated bar 40 and the pawl unit 48 pivotally carried by the gimbal 26.

Inasmuch as applicant's invention involves the prevention of injury to unobservant personnel who may be in the vicinity of the canopy 12 when the latter is being actuated to closed position, the operation of the invention will be described in connection with such a closing sequence of the canopy. At the start of the closing sequence, it will be assumed that the canopy is in the position shown by the broken lines and identified by the reference character 16 in FIG. 1 of the drawings. As such, the elongate bar 40 is extended from its side-by-side relationship with the cylinder housing 22 and lies in essentially the position shown. In this position, the pin or pawl 52 which rides in the groove 44 of FIG. 3 is near the far end of such groove, as illustrated. If now the individual within the cockpit of the aircraft desires to initiate the closing sequence of the canopy, he controls the flow of hydraulic fluid in the cylinder 20 in a conventional manner so that the piston of the cylinder reenters the housing 22. When this occurs, the pin or pawl 52 rides along the groove 44 until it has attained some position within this groove such as indicated by the letter A in FIG. 4. In other words, the pin 52 is riding along the groove 44 in the direction indicated by the arrow. Inasmuch as this action proceeds in a linear fashion due to the constant spaced-apart relationship of the bar 40 and the gimbal 26 upon which the pawl assembly 48 is carried, as shown in FIG. 4, the relative movement between the pin 52 and the bar will continue until the pin reaches a further position indicated by the letter B.

Before proceeding further with a description of the relative movement between the pin or pawl 52 and the elongate bar 40, it should be mentioned that the groove 44 (as best shown in FIG. 4 of the drawings) is widened in the region shown enlarged in such figure, and has a pair of cammed members 54 and 56 located in this widened region. The cammed member 54 is in the general shape of a parallelogram and lies generally intermediate the two sides of the groove, as illustrated, while the cammed member 56 extends into the groove from one side thereof and is irregular in outline. The member 56 is formed with a recess, or reentrant portion, 58 the purpose of which will now be set forth.

Returning to the point where the pin or pawl 52 has reached the position B and is being displaced in a direction indicated by the arrow relative to the elongate bar 40, further relative movement of the pawl will cause it to engage the cam surface portion 60 of the member 56. This will cause the pawl 52 to shift sidewise and enter the recess 58. This position is indicated by reference character C in FIG. 4. Inasmuch as further movement of the pawl relative to the elongate bar 40 is not possible, relative movement between the piston assembly 24 and the cylinder housing 22 ceases, and the canopy 12 remains in an intermediate position where it is neither fully opened or fully closed. This position is selected with a view toward preventing injury to any individual in the vicinity of the canopy who may have an arm or some other portion of his body along the edge of the cockpit where it would be caught and injured by the closing canopy were it to be allowed to attain its fully closed position. However, as just described, the canopy 12 is prevented from fully closing by entry of the pawl 52 into the recess 58.

If the operator of the canopy controls now desires to continue closing the canopy after he has observed the situation and assured himself that no personnel hazard exists, he reverses the means (not shown) for controlling entry of hydraulic fluid into the cylinder 20 so that the canopy now rises toward its original open position. This causes the pawl to leave the recess 58 in the direction indicated by the arrow in FIG. 4 so that its relative position shifts toward the left (in the drawings). Such positional displacement of the pawl 58 relative to the bar 40 causes the pawl to engage and be shifted sidewise by the cam surface portion 62 of the member 54, or, in other words, it is in the position indicated by the letter D. It continues in this fashion until it reaces a further position represented by the letter E. The canopy has now risen for a short distance equal to the axial distance measured between the pawl positions C and E in FIG. 4.

In order to complete a closing of the canopy 12, it is necessary for the individual operating the canopy controls to again reverse the direction of fluid flow to the cylinder 22 so as to resume the canopy closing cycle. This results in a relative movement between the pawl 52 and the bar 40 from position E in FIG. 4 in the direction indicated by the arrow. Inasmuch as linear parallel movement between these two components is always present in the absence of some deviating factor, the pawl 52 continues from position F to a subsequent position F, and then completes its movement along groove 44 until the piston assembly 24 has reached the position shown in solid lines in FIG. 1 and 2, at which position the piston per se is completely enclosed within the cylinder housing 22. At this point, the canopy 12 is completely closed and the desired objective has been achieved.

Opening of the canopy causes the pawl 52 to pass in uninterrupted fashion through the enlarged portion of the groove shown in FIG. 4, progressing from position F to position E to position A in sequence. The recess 58 is accordingly not involved in the *opening* operation to any degree whatsover.

Although forming no part in the present invention, it is necessary when jettisoning the canopy 12 from the position indicated in FIG. 1 of the drawings by the reference character 18 to provide means for separating the entire piston assembly 24 from the cylinder housing 22. This may be achieved by conducting hydraulic fluid under pressure through a hose 64 (FIG. 1) supported by the fixture 36 or some other stationary portion of the aircraft fuselage. This hose 64 leads to the upper portion of the piston assembly 24, the latter containing therewithin some device (not shown) responsive to the application of high fluid pressure for effecting separation of the piston (along with the bar 40) from the cylinder housing 22. The hose 64 lies within the two U-shaped portions of the elongated bar 40, as best shown in FIG. 5 of the drawings. Fluid passing through this hose 64 enters the upper portion of the piston assembly 24 through a coupling member 66, but is emphasized that this apparatus forms no part of the present invention, and is being set forth solely to complete a description of the particular assembly illustrated.

It will now be recognized that applicant's invention achieves its desired result in an extremely simple fashion with the utilization of only a single moving component, that is, the elongated bar 40 which moves in concurrent fashion with the piston assembly 24. Furthermore, the invention apparatus is easily integrated into existing equipment. It has the further function of providing a support and protection for the hose 64, which is necessary in the event that the canopy 12 is to be jettisoned. An additional feature of the concept is that the disclosed apparatus is not susceptible to jamming or malfunctioning, and requires practically no maintenance over extended periods of time. It is installed at minimum cost and assures protection for all individuals working in or near the aircraft upon which the device of the invention has been installed.

Obviously many modifications and variations of the present invention are possible in the light of the above teachings. It is therefore to be understood that within the scope of the appended claims the invention may be practiced otherwise than as specifically described.

I claim:

1. In an aircraft having a cockpit and a canopy movable between open and closed positions by selective energization of a hydraulic cylinder, the piston of said cylinder being by said canopy and the cylinder housing being mounted on the fuselage of said aircraft, said canopy constituting a personnel hazard in that the movement thereof from open to fully closed position is capable of being inadverently initiated, the improvement which comprises:

a safety mechanism for precluding such an inadverently initiated movement of said canopy from open to fully closed position, said mechanism including:

guide means carried by said piston and movable therewith;

a projecting element carried by said cylinder housing, said projecting element engaging said guide means;

said guide means being so configured as to preclude a continuous relative displacement in one direction between said guide means and said projecting element as said cylinder is energized to actuate said canopy from open to fully closed position, as a result of which said canopy is held in a partially open position following initial energization of said cylinder, said guide means being further configured so as to permit further relative displacement in the said one direction between such guide means and the said projecting element following a subsequent energization of said cylinder for a limited period of time to actuate said canopy toward open position, during which limited time there occurs a relative displacement between said guide means and said projecting element in a direction essentially opposite to said one direction.

2. In an aircraft having a cockpit and a canopy movable between open and closed positions by selective energization of a hydraulic cylinder, the piston of said cylinder being carried by said canopy and the cylinder being mounted on the fuselage of said aircraft, said canopy constituting a personnel hazard in that the movement thereof from open to fully closed position is capable of being inadvertently initiated, the improvement which comprises:
 a safety mechanism for precluding such an inadvertently-initiated movement of said canopy from open to fully closed position, said mechanism including:
  an elongated bar carried by said piston and movable therewith, said bar and said piston lying in essentially parallel relationship,
   said bar having at least one essentially longitudinal groove formed therein,
    said groove being provided with a recess intermediate the ends thereof and a cammed surface insert proximate to said recess, and
  at least one pawl carried by said cylinder housing and adapted to ride in said groove as said cylinder is energized to actuate said piston,
   said pawl entering said recess during a closing sequence of said canopy and remaining in said recess to preclude further movement of said canopy toward closed position until the movement of said canopy is reversed to cause said pawl to leave said recess and ride over the said cammed surface portion of said insert,
 whereupon the closing sequence of said canopy may be continued until the latter has reached a fully closed position.

3. The combination of claim 2, in which said essentially longitudinal groove is expanded in a transverse direction in the vicinity of said recess, said cammed surface insert lying in the expanded portion of said groove.

4. The combination of claim 3, in which the movement of said pawl as it leaves said recess and rides over the cammed surface portion of said insert has a transverse component with respect to the longitudinal axis of said elongated bar.

5. In an assembly having a pair of members movable relative to one another, means selectively controllable to move at least one of said members relative to the other member, and means for precluding a continuous relative movement of said members into contiguous relationship, said last-mentioned means including a first element carried by one of said members and movable therewith, a second element carried by the remaining one of said members and arranged to engage said first element, said first and second elements being so designed that, as said two members approach one another, said elements will terminate the relative movement between the former at a point prior to that at which said members are in contiguous relationship, following which the movement of said members toward a contiguous relationship can be resumed only after a time period in which said members recede from one another.

6. In an assembly having a chamber formed with an opening therein, and a closure member selectively actuatable by a hydraulic cylinder between an open position and a closed position in which said member covers the opening in said chamber, the piston of said cylinder being carried by said closure member and the cylinder housing being mounted on a rigid portion of said chamber, said closure member constituting a personnel hazard in that the movement thereof from open to fully closed position is capable of being inadvertently initiated, the improvement which comprises:
 a safety mechanism for precluding such an inadvertently-initiated movement of said closure member from open to fully closed position, said mechanism including:
  guide means carried by said piston and movable therewith;
  a projecting element carried by said cylinder housing, said projecting element engaging said guide means;
  said guide means being so configured as to preclude a continuous relative displacement in one direction between said guide means and said projecting element as said cylinder is energized to actuate said closure member from open to fully closed position, as a result of which said closure member is held in a partially open position following initial energization of said cylinder,
  said guide means being further configured so as to permit further relative displacement in the said one direction between such guide means and the said projecting element following a subsequent energization of said cylinder for a limited period of time to actuate said closure member toward open position, during which limited time there occurs a relative displacement between said guide means and said projecting element in a direction essentially opposite to said one direction.

References Cited

UNITED STATES PATENTS

| | | | |
|---|---|---|---|
| 2,505,651 | 4/1950 | Roth. | |
| 3,237,933 | 3/1966 | Grosswiller et al. | 49—28 |
| 3,299,570 | 1/1967 | Radcliffe | 49—28 X |
| 3,346,992 | 10/1967 | Lodge | 49—340 |

DAVID J. WILLIAMOWSKY, *Primary Examiner.*

J. K. BELL, *Assistant Examiner.*